US009699407B2

(12) United States Patent
Karimi-Cherkandi et al.

(10) Patent No.: US 9,699,407 B2
(45) Date of Patent: *Jul. 4, 2017

(54) CONTENT SECURITY FOR A MOBILE COMMUNICATION TERMINAL

(71) Applicant: Unify GmbH & Co. KG, Munich (DE)

(72) Inventors: Bizhan Karimi-Cherkandi, Boca Raton, FL (US); Farrokh Mohammadzadeh Kouchri, Boca Raton, FL (US); Schah Walli Ali, Boca Raton, FL (US)

(73) Assignee: Unify GmbH & Co. KG, Munich (DE)

( * ) Notice: Subject to any disclaimer, the term of this patent is extended or adjusted under 35 U.S.C. 154(b) by 0 days.

This patent is subject to a terminal disclaimer.

(21) Appl. No.: 15/238,930

(22) Filed: Aug. 17, 2016

(65) Prior Publication Data
US 2016/0360152 A1    Dec. 8, 2016

Related U.S. Application Data

(63) Continuation of application No. 14/237,620, filed as application No. PCT/US2012/035088 on Apr. 26, 2012, now Pat. No. 9,451,209.

(51) Int. Cl.
| | |
|---|---|
| *H04N 7/14* | (2006.01) |
| *H04N 21/41* | (2011.01) |
| *H04N 21/414* | (2011.01) |
| *H04N 21/45* | (2011.01) |

(Continued)

(52) U.S. Cl.
CPC ......... *H04N 7/147* (2013.01); *H04L 63/0428* (2013.01); *H04N 21/414* (2013.01);
(Continued)

(58) Field of Classification Search
CPC ....................................................... H04N 7/14
(Continued)

(56) References Cited

U.S. PATENT DOCUMENTS

| | | | |
|---|---|---|---|
| 6,020,910 A | 2/2000 | Schmidt et al. | |
| 8,522,050 B1* | 8/2013 | Wakerley | H04L 67/1097 713/193 |

(Continued)

FOREIGN PATENT DOCUMENTS

| | | |
|---|---|---|
| GB | 2378854 A | 2/2003 |
| JP | 2006005393 A | 1/2006 |

OTHER PUBLICATIONS

International Search Report of The International Searching Authority for PCT/US2012/035088 dated Jan. 22, 2013.

(Continued)

*Primary Examiner* — Olisa Anwah
(74) *Attorney, Agent, or Firm* — Buchanan Ingersoll & Rooney PC (57) ABSTRACT

A method for outputting sensitive data to a user includes a communication terminal checking to determine whether at least a portion of the sensitive data is to be outputted by determining whether the communication terminal is in one of a plurality of predefined communication configurations for outputting the sensitive data. If the communication terminal is found to be a first configuration, the communication terminal transmits the sensitive data so that at least one of the video data and the audio data is output to the user via at least one peripheral device connected to the communication terminal. If the communication terminal is in a second configuration, the communication terminal performs at least one security action to help further protect the sensitive data.

17 Claims, 6 Drawing Sheets

(51) Int. Cl.
  *H04N 21/454* (2011.01)
  *H04N 21/488* (2011.01)
  *H04N 21/6543* (2011.01)
  *H04N 21/439* (2011.01)
  *H04N 21/4405* (2011.01)
  *H04L 29/06* (2006.01)
  *H04W 12/02* (2009.01)

(52) U.S. Cl.
  CPC ... *H04N 21/4126* (2013.01); *H04N 21/41407* (2013.01); *H04N 21/439* (2013.01); *H04N 21/4405* (2013.01); *H04N 21/4516* (2013.01); *H04N 21/4542* (2013.01); *H04N 21/4882* (2013.01); *H04N 21/6543* (2013.01); *H04W 12/02* (2013.01)

(58) Field of Classification Search
  USPC .................. 348/14.01, 14.07, 14.03, 14.12
  See application file for complete search history.

(56) References Cited

U.S. PATENT DOCUMENTS

| | | |
|---|---|---|
| 2004/0255321 A1 | 12/2004 | Matz |
| 2008/0216108 A1 | 9/2008 | Beaunoir et al. |
| 2009/0235300 A1 | 9/2009 | Hayashi |
| 2010/0205667 A1* | 8/2010 | Anderson ............... G06F 3/013 726/19 |
| 2014/0191964 A1* | 7/2014 | McDonald ............. G06F 3/011 345/158 |
| 2014/0230066 A1* | 8/2014 | Hurwitz ................ H04L 63/102 726/26 |

OTHER PUBLICATIONS

Written Opinion of the International Searching Authority for PCT/US2012/035088 dated Jan. 22, 2013.

* cited by examiner

The communication terminal receives at least one of (i) an indicator that the sensitive data is to be communicated to the communication terminal in a communication session that is to be established by acceptance of a connection and (ii) the sensitive data via the communication session.

The communication terminal checks to determine whether at least a portion of the sensitive data is to be outputted by determining whether the communication terminal is in one of a plurality of predefined communication configurations for outputting the sensitive data. The predefined communication configurations comprise a first configuration for outputting data and a second configuration for outputting data.

If the communication terminal is in the first configuration, the communication terminal transmits the sensitive data so that at least one of the video data and the audio data is output to the user via the at least one peripheral device.

If the communication terminal is in the second configuration, the communication terminal performs at least one of (a) transmitting a warning to the user that indicates the communication terminal is configured to output the sensitive data such that the third party could hear or view the sensitive data and (b) withholding the sensitive data so that the at least one of the video data and the audio data is not output to the user via the communication terminal

FIGURE 6

CONTENT SECURITY FOR A MOBILE COMMUNICATION TERMINAL

CROSS-REFERENCE TO RELATED APPLICATIONS

This application is a continuation of U.S. patent application Ser. No. 14/237,620, which is the United States national phase under 35 U.S.C. §371 of PCT International Application No. PCT/US2012/035088, filed Apr. 26, 2012.

FIELD OF THE INVENTION

The present invention relates to communication systems and, more particularly, to a communication system, a communication device and application for such a device that permits security precautions to be implemented in addition to the exchange of security keys for authorization purposes and use of encryption. Examples of communication devices may include computers, cellular phones, tablets, laptops, personal digital assistants, or other mobile terminal devices that utilize one or more processors that run programs stored on memory connected to the one or more processors to permit communication services to be provided to a user.

BACKGROUND OF THE INVENTION

A secured video call from one person using one communication device to another person using a different communication device may utilize encryption and the exchange of security keys for authenticating the devices and users of those devices. Such security measures are typically taken to protect the data exchanged between the devices over a communication path along which data packets or other data is sent during an established communication. Such security features, however, still rely on a user to be aware of those near the user.

A user must therefore take steps to ensure that others near that user cannot see confidential or privileged data communicated via a video transmitted during the communication session or hear any audio that may be emitted from that person's device. Such issues can occur when a user is participating in such a communication in a public place, such as a restaurant, bus, subway station or sporting event where other unauthorized people may be able to hear or see content that is supposed to remain confidential. If a user fails to appreciate the fact that potential eyedroppers or eavesdroppers are nearby and engages in a communication in such a public place, then sensitive, proprietary or confidential data communicated during a communication session may be improperly disclosed or exposed to others even though the transmitted data was encrypted and sent to an authorized device and authorized user.

A new mechanism is needed to improve the security provided during communication sessions. Preferably such a security mechanism is capable of improving a user's use of a communication device for a confidential or privileged communication session to help ensure the confidentiality of data transmitted during that communication session is not exposed to third parties that are not authorized to learn of such information.

SUMMARY OF THE INVENTION

A method is provided for a communication terminal to output sensitive data that includes at least one video data and audio data. The method including the steps of the communication terminal receiving at least one of (i) an indicator that sensitive data is to be communicated to the communication terminal in a communication session that is to be established with a communication device and (ii) the sensitive data via the communication session. The communication terminal checks to determine whether at least a portion of the sensitive data is to be outputted by determining whether the communication terminal is in one of a plurality of predefined communication configurations for outputting at least one of audio and video based on or defined by the sensitive data. The predefined communication configurations may include a first configuration and a second configuration. The first communication configuration for outputting data may include an arrangement wherein the sensitive data is outputable via at least one peripheral device connected to the communication terminal for outputting at least one of audio and video defined by or based on the sensitive data to only a user of the communication terminal. The second configuration may be an arrangement where the at least one of the audio and video based on or defined by the sensitive data is outputted by the communication terminal such that at least one of the audio and the video is at least one of viewable and audible to a non-user near the communication terminal. If the communication terminal is in the first configuration, the communication terminal transmits the sensitive data so that at least one of the video and the audio is output to the user via the at least one peripheral device. If the communication terminal is in the second configuration, the communication terminal performs at least one security action. The at least one security action includes at least one of (a) transmitting a warning to the user that indicates that the communication terminal is configured to output the sensitive data so that a non-user could hear or view at least one of the audio and the video and (b) withholds at least a portion of the sensitive data so that the at least one of the video and the audio is not output to the user via the communication terminal.

It should be appreciated that a non-user may be near a communication terminal by being a certain distance from the communication terminal, such as between 0 and 5 meters away from the communication terminal such that a non-user may see a display of the communication terminal or hear sound emitted by the communication terminal. A non-user may also be near a communication terminal if that person can see a display of the communication terminal while the user of the communication terminal is using the communication terminal. A non-user may also be considered near a communication terminal if that non-user can hear sound emitted by a speaker of the communication terminal.

The sensitive data may be encrypted data. The encrypted data may include just video data, just audio data, or both audio data and video data. The sensitive data may alternatively not be encrypted but may be data identified as being sensitive data.

The communication terminal may be a mobile communication terminal such as a laptop, cordless telephone, cellular telephone, personal digital assistant, tablet, or a mobile computer device. The at least one peripheral device may include just one peripheral device or may include multiple peripheral devices. For instance, the peripheral device may only be spectacles for viewing video in a personal way or may include both spectacles and earphones. In some embodiments spectacles or other headgear may include both earphones and a display for permitting a secure personal display of images to only the user.

In some embodiments of the method, the sensitive data may include both video data and audio data. The predefined communication configurations may also include a third configuration. In the third configuration, only video may be displayable via the at least one peripheral device and audio is not outputable via one of the at least one peripheral device and the first configuration is defined as being both the video and the audio are outputable via the at least one peripheral device. If the communication terminal determines that the communication terminal is in the third configuration, the communication terminal transmits the video data so that the video is output to the user via the at least one peripheral device. The communication terminal also performs at least one security action that may include transmitting a warning, withholding the audio data so that the audio is not output to the user via the communication terminal or performing both the transmitting the warning and the withholding the audio data.

In yet another embodiment of the method, the third configuration may alternatively be defined as being a configuration wherein audio is outputable via the at least one peripheral device and the video is not outputable via the at least one peripheral device. If the communication terminal determines that it is in the third configuration, it may transmit the audio data so that the at least one peripheral device can emit the audio. The communication terminal may also transmit a warning, withhold the video data, or do both such functions to inform a user that the communication terminal is not configured to output the video so that a non-user could not view the video.

In some embodiments of the method the communication terminal may perform the checking for determining whether at least a portion of the sensitive data is to be output prior to the communication session being established. The communication terminal may withhold the sensitive data so that the sensitive data is not output to the user via the communication terminal by refusing to establish the communication session if it is determined to be in the second configuration when the checking is performed.

In some embodiments of the method, the video data may include at least one frame of prerecorded pictorial data and the method may also include the step of displaying a scrambled video based on the video data and a predefined default video when the at least one peripheral device is connected to the communication terminal and displays the video data. The scrambled video may be scramble by use of static noise, noise in the form of other video data from other pictorial data or prerecorded data, the reordering of video data so that the video data is not played in a proper sequential order or the addition of other data to the video data to scramble the video data.

In some embodiments of the method, the communication terminal may detect at least one peripheral device being connected to the communication terminal after emitting the warning to its user. That warning may inform the user that at least one peripheral device is needed to be coupled to the communication terminal for at least a portion of the sensitive data to be emitted to the user via the communication terminal. The communication terminal may output or transmit the sensitive data to the one or more peripheral devices when it is detected as being coupled to the communication terminal.

The method may also include additional steps in yet other embodiments of the method. For instance, the method may include the step of a communication terminal sending a response message to the communication device seeking toe establish a communication session. The response message may include an indicator that identifies whether the audio, video, or both the audio and video were emitted securely via peripheral devices or whether one of or both of the audio and video were emitted without such precautions being taken. For instance, the indicator of the response message may identify whether the communication terminal was in a configuration that permitted outputting of the audio or video securely via a personal output of the video or audio when the audio or video was output.

In yet other embodiments of the method, the communication terminal may send a response message that identifies whether the at least one of the audio and video are to be outputted via the at least one peripheral device or not. If the indicator identifies that either the audio or video or both is to be outputted by the communication terminal but will not be outputted via the at least one peripheral device, the communication device may send a request message to the communication terminal requesting that the audio, video or both defined by the sensitive data not be outputted. In response to receipt of such a request message, the communication terminal may act to block such non-secure output of the audio or video. The communication terminal may block such unsecure output until at least one peripheral device needed for secure and personal emission of the video or audio is communicatively coupled to the communication terminal.

A communication terminal is also provided. The communication terminal may be configured to perform any of the embodiments of the method. For instance, the communication terminal may include memory, a processor, a receiver unit and at least one interface for connecting to at least one peripheral device for implementing the method. The receiver unit may be part of a transceiver unit in some embodiments of the communication terminal. The communication terminal may also include a speaker or display unit.

A non-transitory computer readable medium having code stored thereon that defines a method that is implemented when the code is executed is also provided. The non-transitory memory may be a computer program such as an application that is stored on memory of a server and is available for download for example. The non-transitory memory may alternatively be code stored on a hard drive of a computer device or on a compact disc, flash memory or other computer readable medium product. The code may define a method when executed by a processor of a computer device such as a communication terminal. For instance, the method defined by the code may include any of the above referenced methods that are also further discussed below.

Other details, objects, and advantages of the invention will become apparent as the following description of certain present preferred embodiments thereof and certain present preferred methods of practicing the same proceeds.

BRIEF DESCRIPTION OF THE DRAWINGS

Present preferred devices, systems, and apparatuses for providing secure communications between multiple communication devices are shown in the accompanying drawings and certain present preferred methods of practicing the same are also illustrated therein. It should be understood that like reference numbers used in the drawings may identify like components.

DETAILED DESCRIPTION OF PRESENT PREFERRED EMBODIMENTS

Embodiments of a communication system utilizing embodiments of a communication terminal 1 may be appreciated from FIGS. 1-6. A telephone 2 or other communication device may send a data stream to the communication terminal 1 via a network connection that extends through at least one network 4. The communication between the telephone 2 and the communication terminal 1 may pass through one or more gateways or other network nodes. One example of such a gateway or node is a switch 3. One such switch could be a private branch exchange (PBX), a router, or a communication server that manages communications for the telephone 2 within the network 4.

Figure 1:
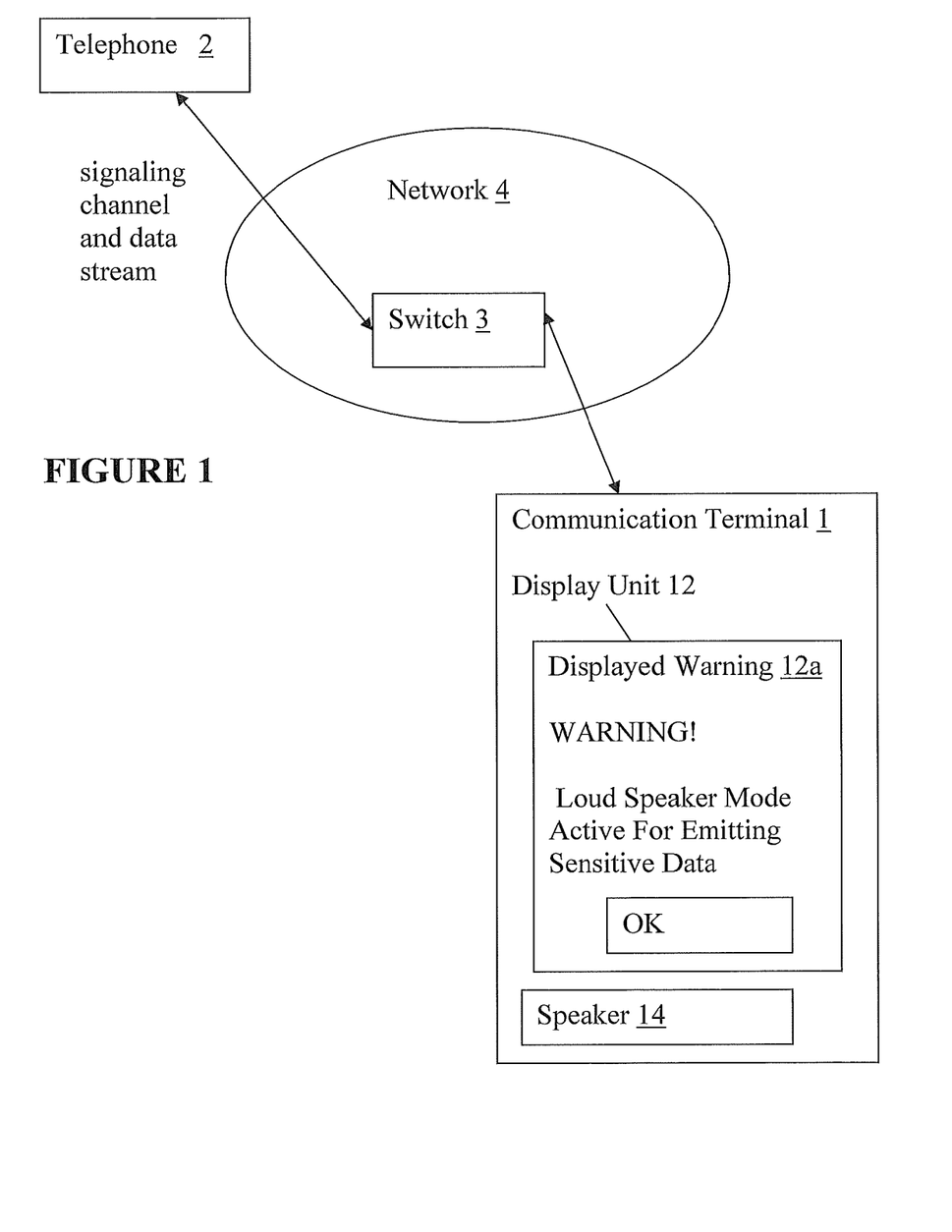
FIG. 1 is a block diagram of a communication system utilizing an embodiment of the communication terminal that receives encrypted data that includes audio data.

The telephone 2 may be a mobile phone, a cellular phone, a videophone, or a PC telephone. The telephone 2 may also be a computer that has a microphone and speaker peripherals attached thereto to enable the user of the computer to place video or audio communications with other users of other communication devices via the computer. The communication terminal 1 may be a phone such as a mobile phone, a cellular phone, or other type of a mobile communication device such as a personal digital assistant, tablet, or laptop computer.

The telephone 2 or other communication endpoint or communication device may send signaling through a channel of a communication path to the communication terminal to establish a communication. That signaling may include, for example, an INVITE message sent to the communication terminal 1 to initiate a communication connection such as a phone call or video phone call. The signaling or establishment of the communication connection may also include an exchange of authorization keys by the telephone 2 and communication terminal 1 to ensure the devices are authorized to verify each device was authenticated. Such an exchange may also utilize an authentication server such as an AAA server or may utilize another type of authorization process.

After the communication connection is established, data such as voice data, audio data, or both voice and audio data may be sent over the communication path in a data stream. The sent data may be encrypted or include an identifier that is associated with the data to identify the data as containing sensitive information, such as confidential information, commercially sensitive information, medical record related information or other data that should not be disclosed to third parties or should only be disclosed to authorized persons.

The communication terminal 1 may be configured to determine whether the data to be sent via the communication connection is sensitive data. Such a determination may be made after the communication connection is established between the telephone 2 and communication terminal 1 or may be made prior to the establishment of such a connection. For example, the signaling used to establish the communication connection may include an indicator that identifies the fact that data to be communicated during the communication connection includes sensitive data. Such an indicator may be associated with all the data to be communicated via the communication connection that is sought to be established. Alternatively, the communication terminal 1 may assess data provided after the communication connection is established to assess whether the received data contains sensitive data.

If it is determined that sensitive data is to be communicated over the communication connection or is sought to be sent over a communication connection that the telephone 2 desired to establish with the communication terminal 1, the communication terminal 1 may be configured to determine whether it is in a configuration that would permit receipt of such data or not. If it is not in a configuration that would permit receipt of such data, the communication terminal may communicate a warning to the user of the communication terminal. The warning may help the user remember that others near the user or the communication terminal may be able to hear or see video or audio that contains sensitive information and that such an occurrence is undesired or contrary to a policy of the user's employer.

For instance, the communication terminal may determine whether it is currently communicatively coupled to one or more peripheral devices that would permit sensitive data to be displayed, audibly emitted, or otherwise output to a user in a personal way so that only that user could hear, see or otherwise receive the sensitive data. If the communication terminal determines it is not so configured to provide such a personal output or transmission of sensitive data to its user, it may be configured to automatically refuse the connection request or may issue a warning to its user that either requires the user to connect at least one peripheral device that permits personal outputting of audio or video to the communication terminal 1 or override the warning by acknowledging the warning and requesting receipt of the data without such peripheral devices being connected. Such a feature may prevent others near enough to the communication terminal to hear audio output from a speaker of the communication terminal or see a video that may be shown on the display of the communication terminal.

It should be understood that an acknowledgment of a warning may be provided in a number of ways by a user. For example, the user may press or otherwise actuate an "OK" button as shown on the display unit 12 in FIG. 1 or by otherwise providing input to the communication terminal that acknowledges the warning. Other examples of providing input may be pressing a button of the communication terminal 1 to provide such input or speaking a command to the communication terminal so that a microphone of the communication terminal 1 configured to receive spoken commands receives the spoken input.

The communication terminal 1 may output a warning to a user to ensure the user of the communication terminal knows that sensitive information is being transmitted and that such information should not be received by any non-users such as nearby people who are not the user that may hear sound emitted from a speaker 14 of the communication terminal or people who may see images illustrated by the display unit 12 of the communication terminal. For instance, if the communication terminal 1 determines that a loud speaker or speaker phone speaker feature of the communication terminal is active and would emit audio based on audio data identified as having sensitive information, the communication terminal may display warning 12a to inform the user that the loud speaker mode is active. The communication terminal 1 may be configured so that no sensitive audio data is emitted when the communication terminal has the loud speaker or speaker phone speaker activated, or may be configured to require a user to acknowledge the warning by providing input to the communication terminal to acknowledge the emitted warning prior to emitting such sensitive audio data, or may be configured to provide a warning to a user and also not permit sensitive data to be output by the communication terminal while it is in a configuration that does not permit the sensitive data to be output in only a personal way to only the user of the communication terminal 1.

In some communication connections, audio and video data may be transmitted by a telephone or other communication endpoint to the communication terminal that are classified as being sensitive data. The communication terminal may only be communicatively coupled to a peripheral device that only permits audio or only permits video to be output in a personal way to only the user of the communication terminal. For instance, the user may wear spectacles on which video is displayed but not have earphones or may have earphones connected to the communication terminal but not have display spectacles or another type of personal visual display peripheral device connected to the communication terminal. When the communication terminal 1 detects such a configuration, the sensitive data that may be output in a personal fashion via the connected peripheral device may be output. Sensitive data that is not able to be output in a personal way may not be output. As another alternative, sensitive data may only be output by the communication terminal after the issuance of a warning to the user of the communication terminal is communicated that requires action by the user via input provided to the communication terminal for the communication terminal to output sensitive data to the user.

For example, if the communication terminal 1 is connected to earphones and receives both video data and audio data that is encrypted and, as a result, determined to contain sensitive data, the communication terminal may send the audio data to the earphones so that the earphones emit audio to the user's ears based on the audio data. But, the communication terminal may not display the video defined by the video data. Instead, the communication terminal may only issue a warning informing the user of the communication terminal that a necessary peripheral device is not attached. If the user provides input to override the warning, the communication terminal may then display a video defined or based on the received sensitive video data via a display unit of the communication terminal. If desired, the data could alternatively be tagged by the communication terminal so that any effort to override the warning results in the data not being transmitted unless a required peripheral device needed for personal outputting of the data is communicatively coupled to the communication terminal for outputting of that sensitive data to the user.

As another example, the communication terminal 1 may be connected to spectacles that may only display video based on received video data but not also emit audio data. The communication terminal connected to the spectacles may then receive encrypted data that includes audio data and video data. The communication terminal may determine that the received data is sensitive data and send the video data to the spectacles so that video may be displayed to the user that is based upon or defined by the sensitive video data. The communication terminal may not emit any audio based on or defined by the sensitive audio data. Instead, the communication terminal may issue a warning to inform the user that the audio data is sensitive and either cannot be emitted or should not be emitted. In some embodiments, the communication terminal may be configured so that the communication terminal 1 emits audio based on or defined by the sensitive audio data after receipt of input from the user that acknowledges the warning or provides input that overrides the issued warning. Alternatively, the communication terminal 1 may be configured so that the sensitive audio data is only outputable if earphones or another type of peripheral device that permits a personal emission of the audio to the user is communicatively coupled to the communication terminal.

It should be appreciated that the communication terminal 1 may be configured to determine whether data contains sensitive information at different times. For instance, some embodiments of the communication terminal may be configured to determine whether sensitive information is sought to be transmitted to the communication terminal prior to the establishment of a communication connection. For example, an INVITE message used to initiate the formation of such a communication connection may include an indicator that indicates that data to be transmitted via the connection that is sought with the communication terminal 1 includes sensitive information. Other embodiments may be configured to assess whether data that is received through a formed communication connection contains sensitive information. Sensitive information may be detected in a number of ways. For example, whether data is considered to include sensitive data may be based on a receipt or detection of an indicator associated with the received data. Data could also be considered sensitive data if the data received by the communication terminal is encrypted.

It should be understood that sensitive data need not be identified due to the fact it is encrypted. Indeed in some embodiments of our system and method, sensitive data may not be encrypted. For example, in some situations, a communication connection may already be secure via use of a private network or corporate network. In other situations, it is possible the data may be sent unencrypted though it is not communicated via a relatively secure communication connection.

In yet other embodiments, data received by the communication terminal may be considered sensitive due to a setting of the communication terminal that configures the communication terminal to identify any received data as being sensitive data. A user may provide input to the communication terminal to activate such a setting when the user only wishes to securely hear or see video or audio due to his surroundings regardless of whether such data may be otherwise identified as sensitive by the sender of that data. If such a setting is actuated, then any received data may be associated with the user activated parameter and be considered sensitive data.

The communication terminal 1 may also be configured to send a return signal or return message to the telephone 2 or other communication device to which the communication terminal 1 may have a communication connection formed or be in the processing of establishing such a connection for a possible communication session. The return message or return signal may inform the telephone 2 or other communication device about whether the communication terminal 1 accepted the sensitive data or the sought communication connection that would include such sensitive data. In the event the sensitive data was received by the communication terminal, the return signal or return message may also provide information to the telephone 2 or other communication device to identify whether the communication terminal presented the sensitive data securely or whether the sensitive data was output as audio or video in an unsecured fashion. For example, such information may be signaled to the telephone or other communication device similar to an INFO message, NOTIFY message, acknowledge message (e.g. "ACK message") or other response message that includes a parameter or other indicator that indicates whether the sensitive data was output securely or non-securely by the communication terminal.

Figure 2:
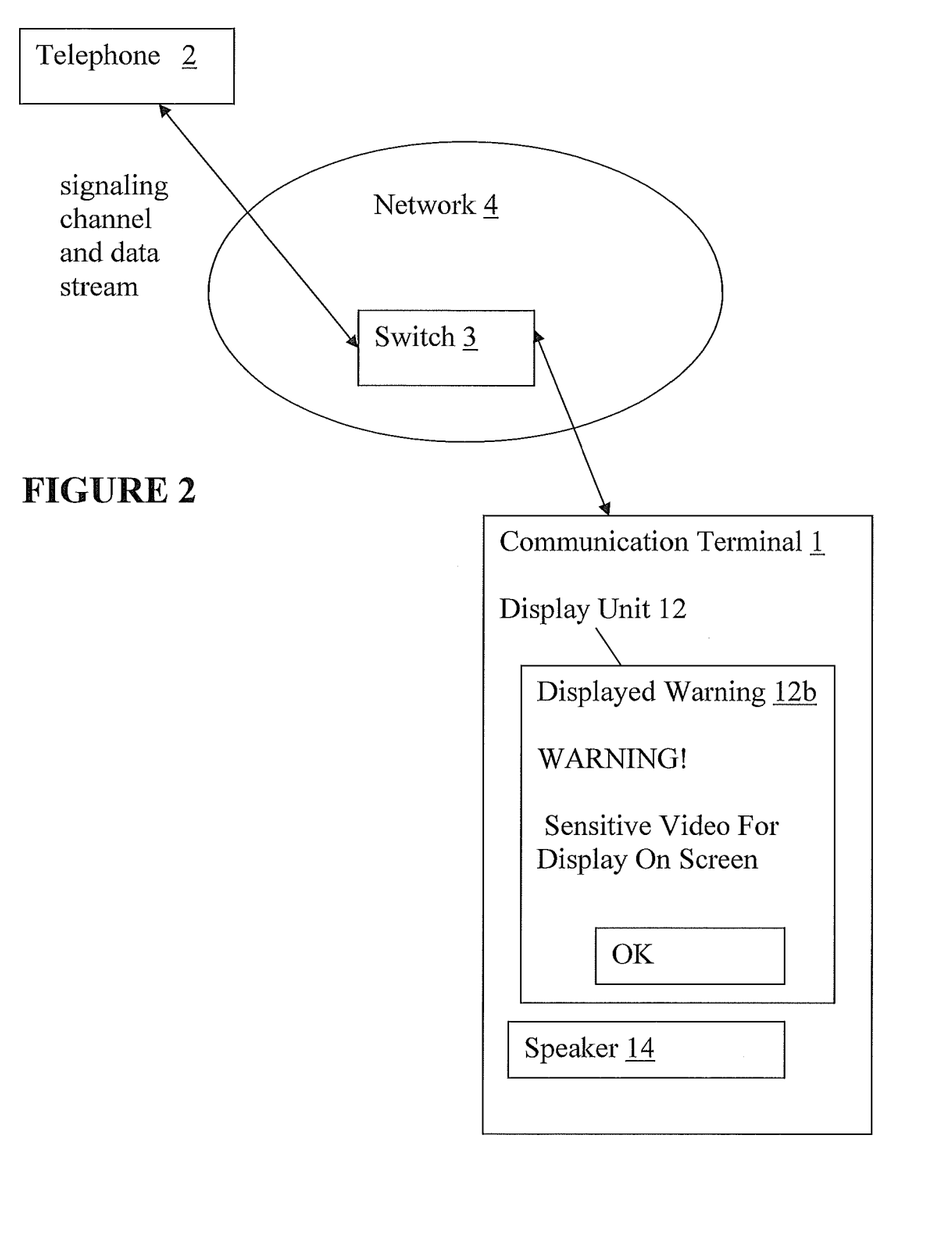
FIG. 2 is a block diagram of a communication system utilizing an embodiment of the communication terminal that receives encrypted data that includes video data.

Referring to FIG. 2, the communication terminal may also be configured to detect sensitive video data provided by the telephone 2 or other communication endpoint sending data to the communication terminal 1. Such a data stream may also include sensitive audio data. Upon a detection of such sensitive video data, the communication terminal 1 may display a warning 12b to the user of the communication terminal via the display unit 12 as shown in FIG. 2. Such a warning may be presented in conjunction with the display device not showing such video data. Alternatively, the communication terminal 1 may be configured to display such sensitive video only after a user acknowledges the warning by providing input via an input device of the communication terminal that acknowledges receipt and understanding of the warning 12b and requests the video still be displayed. Such input may be provided by touching the display if the display unit is configured as a touch screen display. Alternatively, the input may be provided by a user pressing a button or speaking a command that is received by a microphone or otherwise providing input via an input device of the communication terminal 1.

In the event a user chooses to provide input to override the warning and have the audio or video containing sensitive data emitted via a speaker or display of the communication terminal 1 without the use of a peripheral device that would permit such audio or video to be displayed to only the user in a secure fashion, the communication terminal 1 may send a response message to the telephone 2 that includes a parameter or other type of indicator that identifies the fact that the sensitive data was output when the communication terminal was in a configuration that did not permit a secure output of the sensitive data. Such a response message may be sent before the audio or video containing the sensitive data is output to the user via the communication terminal 1. In some embodiments, the telephone 2 may be configured to send a request message to the communication terminal 1 that causes the communication terminal 1 to block the unsecure output of such sensitive video or audio upon receipt of such a request message. The blocking of the output of such audio or video may occur automatically in response to the receipt of such a request message or may occur only after an advisory is displayed via the display unit of the communication terminal that informs the user that the sensitive data has been blocked for output to the user until the communication terminal is placed into a proper configuration via connection of one or more peripheral devices. In other embodiments, the telephone 2 may merely be configured to provide a record to the user of the telephone 2 that identifies the fact that the sensitive video or audio was not output securely by the communication terminal 1.

Figure 3:
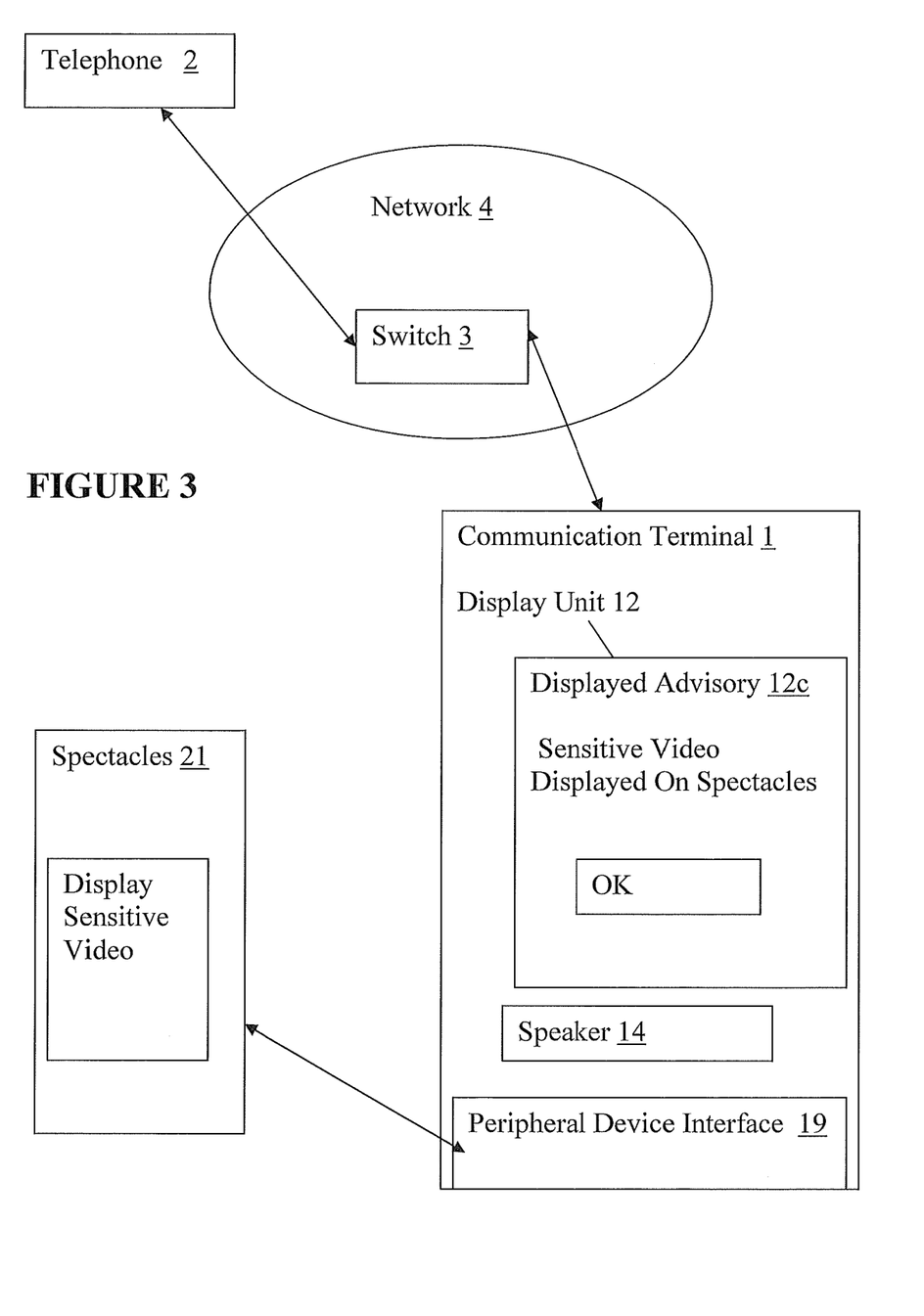
FIG. 3 is a block diagram of a communication system utilizing an embodiment of the communication terminal that receives encrypted data that includes video data.

Referring to FIG. 3, the communication terminal 1 may also be configured to detect the presence of one or more peripheral devices that permit a user of the communication terminal 1 to receive sensitive data in a personal way such that only the user may hear sensitive audio data or see sensitive video data. For instance, a user may wear spectacles 21 that may be communicatively connected to the communication terminal via a peripheral device interface 19 so that sensitive video data may be shown to the user wearing the spectacles so that only the user's eyes see the video output based on the received sensitive video data. As another example, the spectacles 21 may include earphones for positioning in the user's ears for hearing audio emitted based upon the received sensitive audio data. Instead of spectacles, the user may wear a hat or helmet that includes a visor or display that hangs adjacent the user's eyes when the helmet or hat is worn that displays video received from a communication terminal to which it is communicatively connected via a wireless or wired connection to a peripheral device interface of the communication terminal. The display provided by the visor or other display may be configured to provide a personal display of video or images so that only the user wearing the hat or helmet may see the images displayed by the device. The hat or helmet can also include earphones to be positioned adjacent a user's ears so that audio may be emitted by the worn device. As another alternative, a separate set of earphones may also be communicatively coupled to the communication terminal 1 via a peripheral device interface 19 so that audio based on the received sensitive audio data is only emitted within the user's ears.

The communication terminal 1 may be configured so that it detects a connection of such peripheral devices to the communication terminal and as a result determines it is in a configuration for outputting sensitive data to a user in a personal way so that only that user may hear or see such sensitive data. If such a connection is detected, then no warning may be displayed to a user. Instead, an advisory 12c may be displayed to let the user know that the sensitive video or audio is being output via the communicatively coupled or otherwise connected peripheral devices (e.g. the spectacles, earphones, or both the spectacles and earphones).

Figure 4:
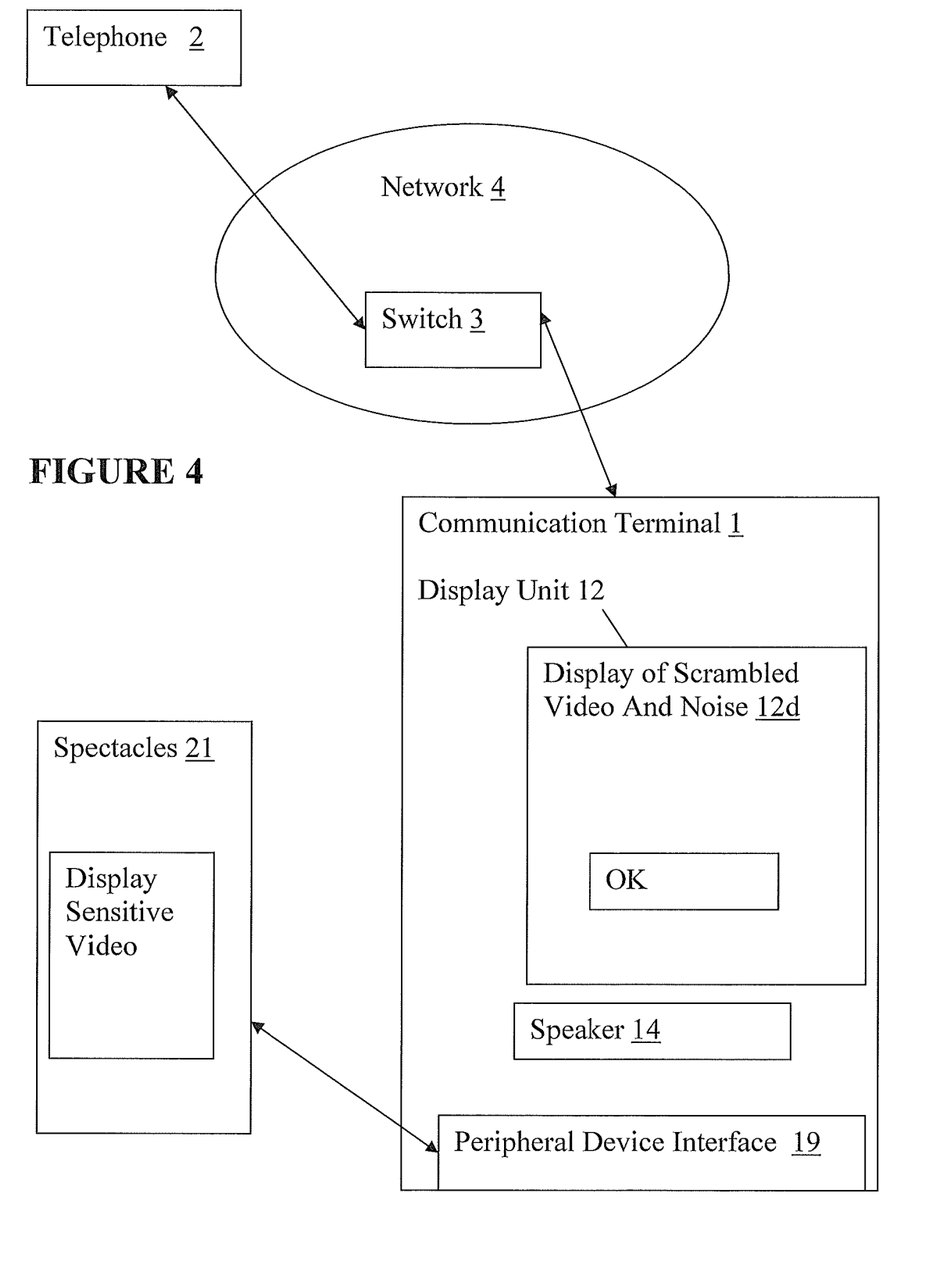
FIG. 4 is a block diagram of a communication system utilizing an embodiment of the communication terminal that receives encrypted data that includes video data.

As may be appreciated from FIG. 4, yet another alternative may utilize the use of scrambled video instead of displaying an advisory 12c. For such an alternative, the communication terminal may display a scrambled video along with noise 12d while the video emitted based upon the received sensitive video data is displayed on a peripheral device such as spectacles or a helmet with a display visor based upon the received sensitive video data. While being shown via the peripheral device, the video may also be shown on the display unit of the communication terminal in such a way that it is not understandable. For instance, the video shown via the display unit 12 of the communication terminal may be scrambled and include added noise or may be otherwise modified so that the content of the video is not understandable as shown on the display of the communication terminal 1. For example, the communication terminal may emit the scrambled video and not permit the user to actually see an understandable version of a video defined by the received sensitive video data or will include noise to distract a nearby eyedropper even more effectively than just added static noise. Examples of added noise may be a plurality of prerecorded graphical frames and audio such as a prerecorded music video or other video that may be played to obscure the real communication video stream. Of course, other video, audio, or combination of video and audio may also be used to obscure the real communication video stream, or just static noise may be added to the transmitted video data or there may be a combination of both static noise along with video, audio or both video and audio to obscure the real communication video stream.

If the communication terminal does not detect a connection with a peripheral device needed for a secure and personal output of sensitive video based upon or defined by sensitive data, the communication terminal 1 may determine it is not in a configuration that permits a personal output of video based upon the sensitive video data needed for a user to receive such sensitive data in a personal way so that only that user sees the video. The communication terminal 1 may be configured to automatically reject receipt of sensitive data if it determines that it is not in a configuration needed for providing sensitive data to a user in a personal way via outputting of data to one or more peripheral devices connected to the communication terminal. For example, the communication terminal 1 may be configured by its user to automatically block receipt of sensitive data if the communication terminal 1 is not in a necessary configuration for secure or personal output of the sensitive data as the user of the communication terminal 1 may desire that he or she never be in a position to share such content with nearby persons. The prevention of the receipt of such data may occur prior to the formation of a communication connection or may occur after such a connection is formed with another communication device. Alternatively, the communication terminal may be configured to identify receipt of such data and provide a warning to a user in response to determining that the communication terminal 1 is not in a configuration needed for a personal output of audio or video defined by the received sensitive data.

In some embodiments, even if the warning is overridden by a user, the communication terminal 1 may be configured to only emit the video that includes added noise. For example, the communication terminal may send a response message to the telephone in response to obtaining input from a user requesting the warning to be overridden. That response message may include an indicator identifying the fact that the user wishes to have the sensitive video output without a needed peripheral device or without the communication terminal 1 being in a secure configuration for such an output. The telephone may send a request message in response to the response message received from the communication terminal 1 that instructs the communication terminal 1 to block display of the sensitive video or to only permit the sensitive video to be displayed with added noise unless or until a peripheral device is coupled to the communication terminal that permits a personal output of the sensitive video.

In yet other embodiments, the communication terminal 1 may be configured so that received content is considered as sensitive because the communication terminal has a parameter set that identifies the fact that the user of the communication terminal wants to consider it sensitive (e.g. due to his specific surrounding) and desires to only watch or hear such received data securely. In such a case, the communication terminal may be configured to identify any received data from the telephone as being sensitive data regardless of whether the telephone 2 provided the data with an indicator indicating that the data was sensitive data. The receipt of any such data is indicated as sensitive based upon a parameter set by a user of the communication terminal that informs the communication terminal 1 to interpret all received data as being sensitive data. In the event the communication terminal interprets data that is only identified as being sensitive due to the setting of such a received data parameter, the communication terminal 1 may not send any signal or message to the telephone 2 or other communication device to inform that device of how the received data was output by the communication terminal 1.

Figure 5:
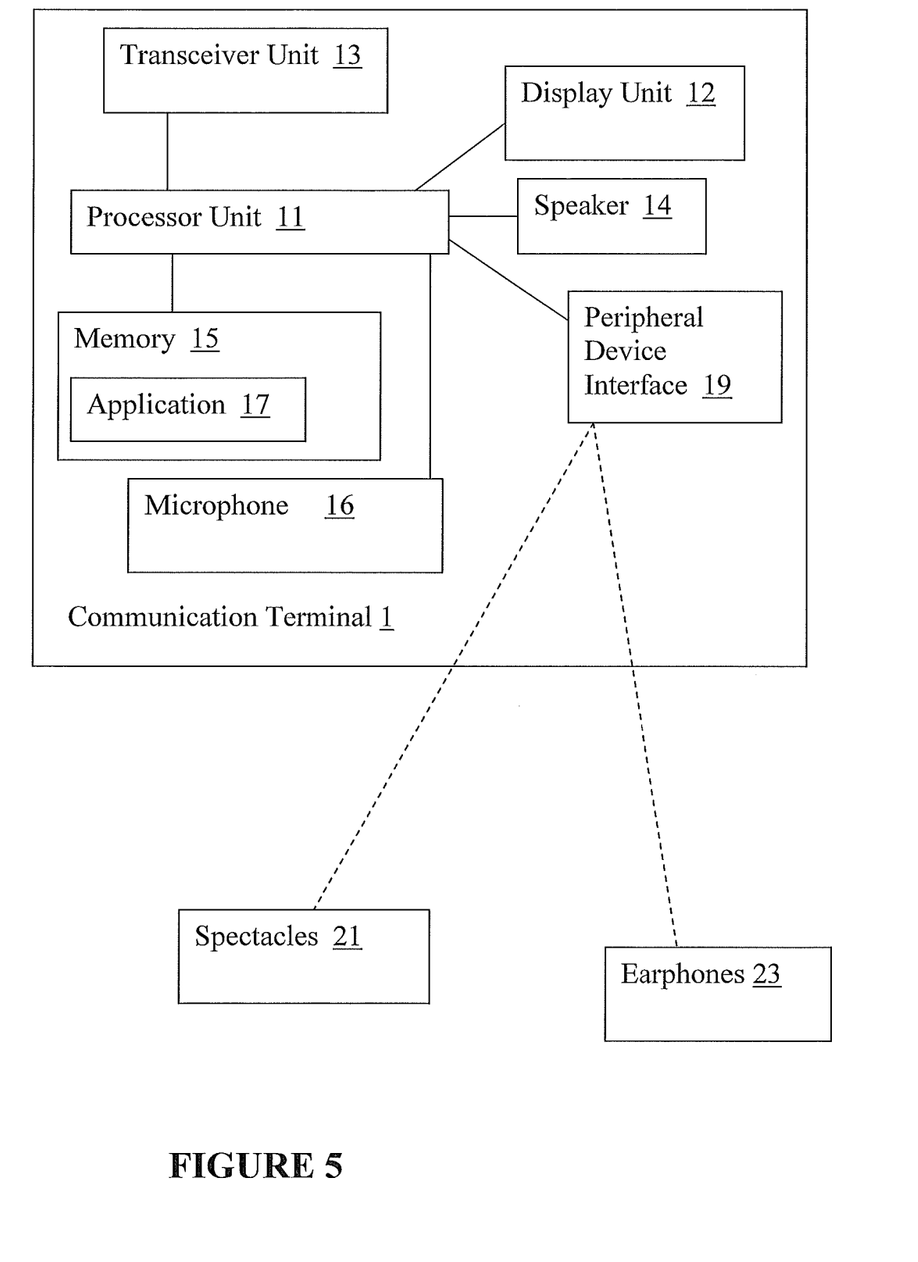
FIG. 5 is a block diagram of an exemplary embodiment of the communication terminal.
Figure 6:
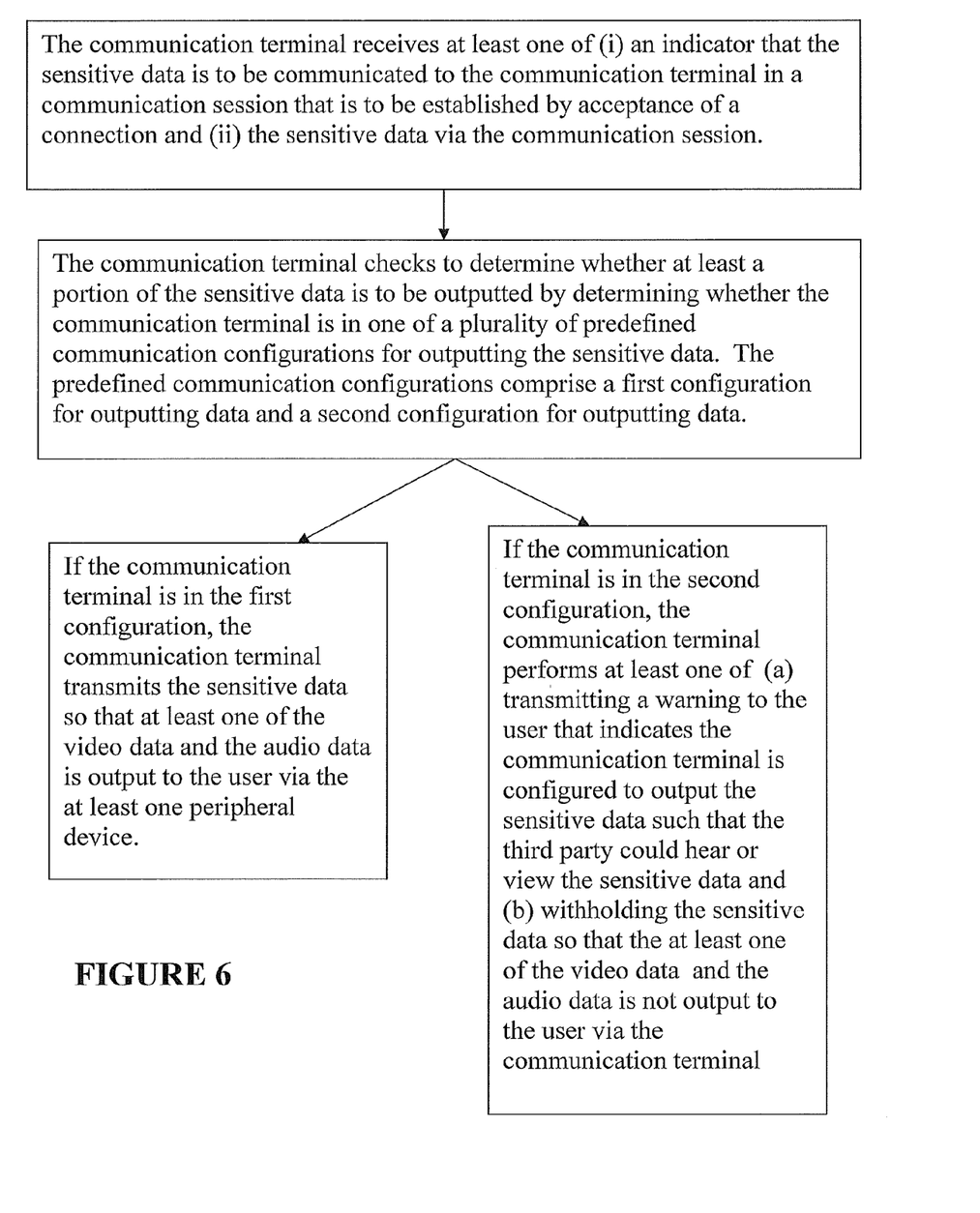
FIG. 6 is a flow chart illustrating one embodiment of a method of using the communication terminal to output encrypted data or other data identified as containing sensitive information.

Referring to FIG. 5, an embodiment of the communication terminal 1 may include a processor unit 11 that is connected to memory 15, such as at least one non-transitory memory. The processor unit 11 may be a microprocessor, a central processor unit, or other hardware element configured to process or run applications 17 or programs stored in the memory 15. The processor unit 11 may be connected to a transceiver unit 13, which may include at least one transmission device and at least one receiver device for sending and receiving data from other communication devices. The transceiver unit 13 may be configured to permit the receipt and transmission of data via at least one of a wireless connection and a wired connection.

The processor unit 11 may also be connected to a microphone 16, display unit 12, speaker 14 and peripheral device interface 19. The processor may communicate with the display unit 12 to cause graphics to be displayed on a screen or display of the communication terminal 1. The processor 11 may communicate with the speaker 14 so that audio is emitted from the speaker. The microphone 16 may receive audio input and communicate that input to the processor either directly or via storage of such input in the memory 15. The processor 11 may be connected to the peripheral device interface 19 so that data may be sent to at least one peripheral device so that the peripheral device may utilize or output video or audio that is based on or defined by the sensitive data received by the communication terminal. Examples of a peripheral device may include earphones 23, spectacles 21 configured to display video or graphical data or spectacles 21 that include earphones so that both audio and visual data may be communicated directly and personally to a user of the communication terminal.

The peripheral device interface 19 may include multiple jacks for forming wired connections to different peripheral device, and may also, or alternatively, include a wireless connection mechanism for wirelessly connecting to such devices. The peripheral device interface 19 may be configured to utilize Bluetooth or other wireless connection mechanisms, for example, for connecting to one or more peripheral devices. The processor 11 may be configured to detect when a peripheral device is connected to the communication terminal 1 via the peripheral device interface 19 for use in determining whether sensitive data should be sent to the peripheral device for outputting to a user.

It should be understood that the video data or audio data sent to peripheral device communicatively coupled to the communication terminal 1 via a wireless connection or other connection may be encrypted so that the peripheral device must decrypt the received data prior to displaying or outputting the video or audio defined by the received sensitive data. For instance, if a peripheral device is communicatively coupled via a Bluetooth wireless connection or other wireless connection to the communication terminal 1, the transmission of sensitive data to the peripheral device may include encrypting of that transmitted data by the communication terminal prior to the forwarding of that data to the peripheral device. The peripheral device then may need to decrypt the encrypted data prior to outputting the audio or video based on the encrypted data transmitted by the communication terminal.

It should be understood that sensitive information may be identified as sensitive because it is encrypted or because it includes some other identifier indicating that the data is not to be distributed to unauthorized persons. For instance, the data could include or be associated with a confidentiality identifier to identify the fact that the data is sensitive data that is not to be distributed to unauthorized persons or an identifier indicating that the data is not to be communicated to unauthorized devices, or an identifier indicating that the data is classified. Sensitive information may include commercially important data, trade secrets, or data that users engaged in the communication session do not want their competitors to know about or others within their organization to know about. Other examples of sensitive information may include data related to a patient medical history, personal identification numbers (e.g. social security number, personal identification number assigned by an entity, etc.), profiles of customers or vendors, bank account information for a company, customer, vendor, contractor or employee, or customer credit card information. Yet another example of sensitive information may be images, audio, or other data describing a commercial accident, a manufacturing problem, a product design, or personal data a user may not want to share with third parties or people near the user of the communication terminal 1.

It should be appreciated that many different types of variations to the above discussed embodiments of the communication terminal, communication system, and method of making and using the same may be made. For instance, the sensitive information may not be encrypted in some embodiments, but may instead merely use an identifier located in a portion of the data or sent in such a way as to be associated with transmitted data to identify the fact that the data is sensitive data. As another example, the spectacles, hat or helmet peripheral devices may alternatively be replaced with another type of output device sized and configured to be positioned over a user's eyes to display graphical or textual data to at least one of that user's eyes and may also include at least one earphone for communicating audio data to at least one of the ears of the user. As yet another example, the communication terminal may be a laptop, tablet, or other type of mobile computer device that is able to communicate with other devices via at least one network connection, such as an internet connection, enterprise network connection, or cellular network connection.

While certain present preferred embodiments of the communication terminal, communication system, and methods of making and using the same have been shown and described above, it is to be distinctly understood that the invention is not limited thereto but may be otherwise variously embodied and practiced within the scope of the following claims.

The invention claimed is:

1. A non-transitory computer readable medium having code stored thereon that defines a method that is implemented when the code is executed by a communication terminal, the method defined by the code comprising:
in response to the communication terminal receiving at least one of (i) an indicator that sensitive data is to be communicated to the communication terminal in a communication session that is to be established and (ii) the sensitive data via the communication session, the sensitive data comprising at least one of video data and audio data, the video data defining a video and the audio data defining audio, the communication terminal checking to determine whether at least a portion of the sensitive data is to be outputted by determining whether the communication terminal is in one of a plurality of predefined communication configurations for outputting at least one of the video and the audio, the predefined communication configurations comprising a first configuration for outputting data and a second configuration for outputting data, the first configuration being an arrangement wherein at least one of the audio and the video is outputable for outputting at least one of the audio and the video to only a user of the communication terminal, the second configuration being an arrangement wherein at least one of the video and the audio is outputted by the communication terminal such that at least one of the video and the audio is at least one of viewable and audible to a non-user near the communication terminal;
upon a determination that the communication terminal is in the first configuration, the communication terminal transmitting the sensitive data so that at least one of the video and the audio is output to the user; and
upon a determination that the communication terminal is in the second configuration, the communication terminal performing at least one security action, the at least one security action comprising at least one of (a) transmitting a warning to the user that indicates the communication terminal is configured to output at least one of the audio and the video such that the non-user could hear or view at least one of the audio and the video and (b) withholding the sensitive data so that the at least one of the video and the audio is not output to the user via the communication terminal; and
wherein the first configuration comprises the communication terminal being connected to at least one of: an audio outputting device that has at least one earphone, a video displaying device comprised of headwear having at least one display for displaying the video, and a video displaying device comprised of spectacles having at least one display for displaying the video.

2. The computer readable medium of claim 1 wherein the sensitive data is encrypted data comprised of both video data and audio data and the communication terminal is a mobile communication terminal.

3. The computer readable medium of claim 1 wherein the communication terminal is a mobile telephone, a cellular telephone, a laptop, a personal digital assistant, a tablet, or a mobile computer device and wherein the sensitive data is determined to be sensitive because at least one of: (a) the sensitive data comprises an identifier indicating the sensitive data is to not be shared with unauthorized people and (b) the communication terminal has a parameter set that indicates that any audio data, video data or both audio data and video data received by the communication terminal is to be considered sensitive data.

4. A non-transitory computer readable medium having code stored thereon that defines a method that is implemented when the code is executed by a communication terminal, the method defined by the code comprising:
in response to the communication terminal receiving at least one of (i) an indicator that sensitive data is to be communicated to the communication terminal in a communication session that is to be established and (ii) the sensitive data via the communication session, the sensitive data comprising at least one of video data and audio data, the video data defining a video and the audio data defining audio, the communication terminal checking to determine whether at least a portion of the sensitive data is to be outputted by determining whether the communication terminal is in one of a plurality of predefined communication configurations for outputting at least one of the video and the audio, the predefined communication configurations comprising a first configuration for outputting data and a second configuration for outputting data, the first configuration being an arrangement wherein at least one of the audio and the video is outputable for outputting at least one of the audio and the video to only a user of the communication terminal, the second configuration being an arrangement wherein at least one of the video and the audio is outputted by the communication terminal such that at least one of the video and the audio is at least one of viewable and audible to a non-user near the communication terminal;

upon a determination that the communication terminal is in the first configuration, the communication terminal transmitting the sensitive data so that at least one of the video and the audio is output to the user; and upon a determination that the communication terminal is in the second configuration, the communication terminal performing at least one security action, the at least one security action comprising at least one of (a) transmitting a warning to the user that indicates the communication terminal is configured to output at least one of the audio and the video such that the non-user could hear or view at least one of the audio and the video and (b) withholding the sensitive data so that the at least one of the video and the audio is not output to the user via the communication terminal; and wherein the sensitive data comprises both the video data and the audio data and wherein the predefined communication configurations also comprise a third configuration wherein the video is displayable via at least one peripheral device and the audio is not outputable via one of the at least one peripheral device, and wherein the first configuration is defined so that both the video and the audio are outputable via the at least one peripheral device;

and wherein the method further comprises:
upon a determination that the communication terminal is in the third configuration, the communication terminal transmitting the video data so that the video is output to the user via the at least one peripheral device and also performing at least one security action, the at least one security action comprising at least one of (a) transmitting a warning to the user that indicates the communication terminal is configured to output the audio such that the non-user could hear the audio and (b) withholding the audio data so that the audio is not output to the user via the communication terminal.

5. A non-transitory computer readable medium having code stored thereon that defines a method that is implemented when the code is executed by a communication terminal, the method defined by the code comprising:

in response to the communication terminal receiving at least one of (i) an indicator that sensitive data is to be communicated to the communication terminal in a communication session that is to be established and (ii) the sensitive data via the communication session, the sensitive data comprising at least one of video data and audio data, the video data defining a video and the audio data defining audio, the communication terminal checking to determine whether at least a portion of the sensitive data is to be outputted by determining whether the communication terminal is in one of a plurality of predefined communication configurations for outputting at least one of the video and the audio, the predefined communication configurations comprising a first configuration for outputting data and a second configuration for outputting data, the first configuration being an arrangement wherein at least one of the audio and the video is outputable for outputting at least one of the audio and the video to only a user of the communication terminal, the second configuration being an arrangement wherein at least one of the video and the audio is outputted by the communication terminal such that at least one of the video and the audio is at least one of viewable and audible to a non-user near the communication terminal;

upon a determination that the communication terminal is in the first configuration, the communication terminal transmitting the sensitive data so that at least one of the video and the audio is output to the user; and upon a determination that the communication terminal is in the second configuration, the communication terminal performing at least one security action, the at least one security action comprising at least one of (a) transmitting a warning to the user that indicates the communication terminal is configured to output at least one of the audio and the video such that the non-user could hear or view at least one of the audio and the video and (b) withholding the sensitive data so that the at least one of the video and the audio is not output to the user via the communication terminal; and wherein the sensitive data comprises both the video data and the audio data and wherein the predefined communication configurations also comprise a third configuration wherein the audio is outputable via at least one peripheral device and the video is not outputable via one of the at least one peripheral device, and wherein the first configuration is defined so that both the video and the audio are outputable via the at least one peripheral device; and wherein the method further comprises:
upon a determination that the communication terminal is in the third configuration, the communication terminal transmitting the audio data so that the audio is output to the user via the at least one peripheral device.

6. The computer readable medium of claim 5 wherein the method also comprises:

performing at least one security action comprising at least one of (a) transmitting a warning to the user that indicates the communication terminal is configured to output the video such that the non-user could view the video and (b) withholding the video data so that the video is not output to the user via the communication terminal.

7. The computer readable medium of claim 1 wherein the video data is comprised of at least one frame of prerecorded pictorial data wherein the method further comprises the communication terminal displaying a scrambled video based on the video data and a predefined default video when the at least one peripheral device is connected to the communication terminal and displays the video data.

8. A non-transitory computer readable medium having code stored thereon that defines a method that is implemented when the code is executed by a communication terminal, the method defined by the code comprising:

in response to the communication terminal receiving at least one of (i) an indicator that sensitive data is to be communicated to the communication terminal in a communication session that is to be established and (ii) the sensitive data via the communication session, the sensitive data comprising at least one of video data and audio data, the video data defining a video and the audio data defining audio, the communication terminal checking to determine whether at least a portion of the sensitive data is to be outputted by determining whether the communication terminal is in one of a plurality of predefined communication configurations for outputting at least one of the video and the audio, the predefined communication configurations comprising a first configuration for outputting data and a second configuration for outputting data, the first configuration being an arrangement wherein at least one of the audio and the video is outputable for outputting at least one of the audio and the video to only a user of the communication terminal, the second configuration being an arrangement wherein at least one of the video and the audio is outputted by the communication terminal such that at least one of the video and the audio is at least one of viewable and audible to a non-user near the communication terminal;

upon a determination that the communication terminal is in the first configuration, the communication terminal transmitting the sensitive data so that at least one of the video and the audio is output to the user; and upon a determination that the communication terminal is in the second configuration, the communication terminal performing at least one security action, the at least one security action comprising at least one of (a) transmitting a warning to the user that indicates the communication terminal is configured to output at least one of the audio and the video such that the non-user could hear or view at least one of the audio and the video and (b) withholding the sensitive data so that the at least one of the video and the audio is not output to the user via the communication terminal; and wherein the communication terminal performs the checking prior to the communication session being established and withholds the sensitive data so that the sensitive data is not output to the user via the communication terminal by refusing to establish the communication session when the communication terminal is in the second configuration.

9. A non-transitory computer readable medium having code stored thereon that defines a method that is implemented when the code is executed by a communication terminal, the method defined by the code comprising:

in response to the communication terminal receiving at least one of (i) an indicator that sensitive data is to be communicated to the communication terminal in a communication session that is to be established and (ii) the sensitive data via the communication session, the sensitive data comprising at least one of video data and audio data, the video data defining a video and the audio data defining audio, the communication terminal checking to determine whether at least a portion of the sensitive data is to be outputted by determining whether the communication terminal is in one of a plurality of predefined communication configurations for outputting at least one of the video and the audio, the predefined communication configurations comprising a first configuration for outputting data and a second configuration for outputting data, the first configuration being an arrangement wherein at least one of the audio and the video is outputable for outputting at least one of the audio and the video to only a user of the communication terminal, the second configuration being an arrangement wherein at least one of the video and the audio is outputted by the communication terminal such that at least one of the video and the audio is at least one of viewable and audible to a non-user near the communication terminal;

upon a determination that the communication terminal is in the first configuration, the communication terminal transmitting the sensitive data so that at least one of the video and the audio is output to the user; and upon a determination that the communication terminal is in the second configuration, the communication terminal performing at least one security action, the at least one security action comprising at least one of (a) transmitting a warning to the user that indicates the communication terminal is configured to output at least one of the audio and the video such that the non-user could hear or view at least one of the audio and the video and (b) withholding the sensitive data so that the at least one of the video and the audio is not output to the user via the communication terminal; and wherein the sensitive data is comprised of both the video data and the audio data and the communication terminal is a mobile communication terminal; and wherein the method further comprises:

after transmitting the warning, the communication terminal detecting at least one peripheral device being connected to the communication terminal; and the communication terminal transmitting the sensitive data so that at least one of the video and the audio is output to the user via at least one peripheral device after detecting a connection of the at least one peripheral device.

10. A communication terminal comprising:

at least one processor;

at least one non-transitory memory connected to the processor such that the processor runs applications stored in the memory;

at least one receiver unit for receiving data from a communication device during a communication session established with the communication device such that the communication terminal is configured to receive at least one of (i) an indicator that sensitive data is to be communicated to the communication terminal in a communication session that is to be established and (ii) the sensitive data via the communication session, the sensitive data comprising at least one of audio data and video data, the audio data defining audio and the video data defining a video;

the communication terminal configured to check to determine whether at least one of the audio and the video is to be outputted by determining whether the communication terminal is in one of a plurality of predefined communication configurations for outputting at least one of the video and the audio, the predefined communication configurations comprising a first configuration for outputting data and a second configuration for outputting data, the first configuration being an arrangement wherein at least one of the video and the audio is outputable to only a user of the communication terminal, the second configuration being an arrangement wherein at least one of the video and the audio is outputted by the communication terminal such that the sensitive data is at least one of viewable and audible to a non-user near the communication terminal;

the communication configured such that, upon determining that the communication terminal is in the first configuration, the communication terminal transmits the sensitive data so that at least one of the video and the audio is output to the user; and the communication configured such that, upon determining that the communication terminal is in the second configuration, the communication terminal performing at least one security action, the at least one security action comprising at least one of (a) transmitting a warning to the user that indicates the communication terminal is configured to output at least one of the audio and the video such that the non-user could understand that output and (b) withholding at least a portion of the sensitive data so that the at least one of the video and the audio is not output to the user via the communication terminal; and wherein first configuration comprises the communication terminal being connected to at least one of: an audio outputting device that has at least one earphone, a video displaying device comprised of headwear having at least one display for displaying the video, and a video displaying device comprised of spectacles having at least one display for displaying the video.

11. The communication terminal of claim 10 wherein the communication terminal is a mobile communication terminal.

12. The communication terminal of claim 10 comprising:
at least one peripheral device comprised of at least one of: a video displaying device sized and configured to be worn on a head of the user and an audio outputting device that is to be worn adjacent to at least one ear of the user.

13. The communication terminal of claim 10 wherein the communication terminal is determined to identify the sensitive data based on at least one of: (a) the sensitive data comprising an identifier indicating the data is to not be shared with unauthorized people and (b) the communication terminal has a parameter set that indicates that any audio data, video data or both audio data and video data is to be considered sensitive data.

14. A communication terminal comprising:
at least one processor;
at least one non-transitory memory connected to the processor such that the processor runs applications stored in the memory;
at least one receiver unit for receiving data from a communication device during a communication session established with the communication device such that the communication terminal is configured to receive at least one of (i) an indicator that sensitive data is to be communicated to the communication terminal in a communication session that is to be established and (ii) the sensitive data via the communication session, the sensitive data comprising at least one of audio data and video data, the audio data defining audio and the video data defining a video;
the communication terminal configured to check to determine whether at least one of the audio and the video is to be outputted by determining whether the communication terminal is in one of a plurality of predefined communication configurations for outputting at least one of the video and the audio, the predefined communication configurations comprising a first configuration for outputting data and a second configuration for outputting data, the first configuration being an arrangement wherein at least one of the video and the audio is outputable to only a user of the communication terminal, the second configuration being an arrangement wherein at least one of the video and the audio is outputted by the communication terminal such that the sensitive data is at least one of viewable and audible to a non-user near the communication terminal;
the communication configured such that, upon determining that the communication terminal is in the first configuration, the communication terminal transmits the sensitive data so that at least one of the video and the audio is output to the user; and the communication configured such that, upon determining that the communication terminal is in the second configuration, the communication terminal performing at least one security action, the at least one security action comprising at least one of (a) transmitting a warning to the user that indicates the communication terminal is configured to output at least one of the audio and the video such that the non-user could understand that output and (b) withholding at least a portion of the sensitive data so that the at least one of the video and the audio is not output to the user via the communication terminal; and wherein the predefined communication configurations also comprise a third configuration wherein the video is displayable via the at least one peripheral device and the audio is not outputable via the at least one peripheral device, and wherein the first configuration is defined so that both the video and the audio are outputable via the at least one peripheral device; and wherein the communication terminal is configured so that, in response to determining that the communication terminal is in the third configuration, the communication terminal transmits the video data so that the video is output to the user via the at least one peripheral device and also performs at least one security action comprising at least one of: (a) transmitting a warning to the user that indicates the communication terminal is configured to output the audio such that the non-user could hear the audio and (b) withholding the audio data so that the audio is not output to the user via the communication terminal.

15. A communication terminal comprising:
at least one processor;
at least one non-transitory memory connected to the processor such that the processor runs applications stored in the memory;
at least one receiver unit for receiving data from a communication device during a communication session established with the communication device such that the communication terminal is configured to receive at least one of (i) an indicator that sensitive data is to be communicated to the communication terminal in a communication session that is to be established and (ii) the sensitive data via the communication session, the sensitive data comprising at least one of audio data and video data, the audio data defining audio and the video data defining a video;
the communication terminal configured to check to determine whether at least one of the audio and the video is to be outputted by determining whether the communication terminal is in one of a plurality of predefined communication configurations for outputting at least one of the video and the audio, the predefined communication configurations comprising a first configuration for outputting data and a second configuration for outputting data, the first configuration being an arrangement wherein at least one of the video and the audio is outputable to only a user of the communication terminal, the second configuration being an arrangement wherein at least one of the video and the audio is outputted by the communication terminal such that the sensitive data is at least one of viewable and audible to a non-user near the communication terminal;
the communication configured such that, upon determining that the communication terminal is in the first configuration, the communication terminal transmits the sensitive data so that at least one of the video and the audio is output to the user; and the communication configured such that, upon determining that the communication terminal is in the second configuration, the communication terminal performing at least one security action, the at least one security action comprising at least one of (a) transmitting a warning to the user that indicates the communication terminal is configured to output at least one of the audio and the video such that the non-user could understand that output and (b) withholding at least a portion of the sensitive data so that the at least one of the video and the audio is not output to the user via the communication terminal; and wherein the sensitive data comprises both the video data and the audio data and wherein the predefined communication configurations also comprise a third configuration wherein the audio is outputable via the at least one peripheral device and the video is not outputable via the at least one peripheral device, and wherein the first configuration is defined so that both the video and the audio are outputable via the at least one peripheral device; and wherein the communication terminal is configured so that, in response to determining that the communication terminal is in the third configuration, the communication terminal transmitting the audio data so that the audio is output to the user via the at least one peripheral device and also performing at least one security action comprising at least one of: (a) transmitting a warning to the user that indicates the communication terminal is configured to output the video such that the non-user could view the video and (b) withholding the video data so that the video is not output to the user via the communication terminal.

16. A method of using a communication terminal comprising:

in response to the communication terminal receiving at least one of (i) an indicator that sensitive data is to be communicated to the communication terminal in a communication session that is to be established with a communication device and (ii) the sensitive data via the communication session, the communication terminal checking to determine whether at least a portion of the sensitive data is to be outputted by determining whether the communication terminal is in one of a plurality of predefined communication configurations for outputting at least one of audio and video based on or defined by the sensitive data, the predefined communication configurations comprising a first configuration for outputting data and a second configuration for outputting data, the first configuration being an arrangement wherein the sensitive data is outputable to only a user of the communication terminal, the second configuration being an arrangement wherein the at least one of the audio and video based on or defined by the sensitive data is outputted by the communication terminal such that that at least one of audio and video is at least one of viewable and audible to a non-user adjacent the communication terminal;

upon a determination that the communication terminal is in the first configuration, the communication terminal transmitting the sensitive data so that at least one of the video and the audio is output to the user via the at least one peripheral device;

upon a determination that the communication terminal is in the second configuration, the communication terminal performing at least one security action comprising at least one of (a) transmitting a warning to the user that indicates the communication terminal is configured to output the sensitive data such that the non-user could hear or view at least one of the audio and the video and (b) withholding at least a portion of the sensitive data so that the at least one of the video and the audio is not output to the user via the communication terminal; and the communication terminal receiving the sensitive data from the communication device after authorizing the communication device by exchanging security keys with the communication device and wherein the sensitive data is identified as being sensitive because the sensitive data is encrypted.

17. The method of claim 16, wherein an entirety of the sensitive data is withheld.

* * * * *